United States Patent [19]

Jarr

[11] Patent Number: 4,679,587

[45] Date of Patent: Jul. 14, 1987

[54] LEAK DETECTOR WITH TWO STAGE PISTON CHAMBER

[75] Inventor: Klaus D. Jarr, Overland Park, Kans.

[73] Assignee: The Marley-Wylain Company, Mission Woods, Kans.

[21] Appl. No.: 917,858

[22] Filed: Oct. 14, 1986

[51] Int. Cl.⁴ .............................................. B67D 5/34
[52] U.S. Cl. ................................. 137/509; 73/40.5 R
[58] Field of Search ...................... 137/509; 73/40.5 R

[56] References Cited

U.S. PATENT DOCUMENTS 3,236,256 2/1966 Valentine ............................. 137/509
3,454,195 7/1969 Deters .

OTHER PUBLICATIONS

"New Red Jacket 'Two-Second' Leak Detector for Remote Submersible Petroleum Pumping Systems", Red Jacket Pumps, a Marley Company, Form No. 5170 6/80.

Primary Examiner—Robert G. Nilson
Attorney, Agent, or Firm—Schmidt, Johnson, Hovey & Williams

[57] ABSTRACT

A pressure sensing piston connected to a valve of a leak detector senses leakage of gasoline from underground piping and restricts the flow of gasoline through the piping whenever any leakage exceeds a certain, predetermined rate of flow. The piston is shiftably received in a piston chamber and carries an inner cylindrical wall that is sealingly engageable with a mating cylindrical seal of structure connected to the piston chamber whenever the valve of the detector is in a leak sensing position to enhance movement of the valve in accordance with relatively small changes in the volume of fluid within the region. Once pressure in the piping has built to a value sufficient to raise the piston and disengage the walls from the seal, fluid from the piping is presented to the entire cross-sectional area of the piston chamber including the entire area of the piston face so that a greater volume in the piston chamber is presented to accumulate gasoline and to substantially preclude movement of the valve back to a reduced flow, metering position due to thermal contraction of gasoline within the piping. A venting device mounted in a passageway of the piston releases gasoline that would otherwise be trapped below the piston in areas outside of the wall as the piston is moved toward the bottom of the piston chamber.

8 Claims, 4 Drawing Figures

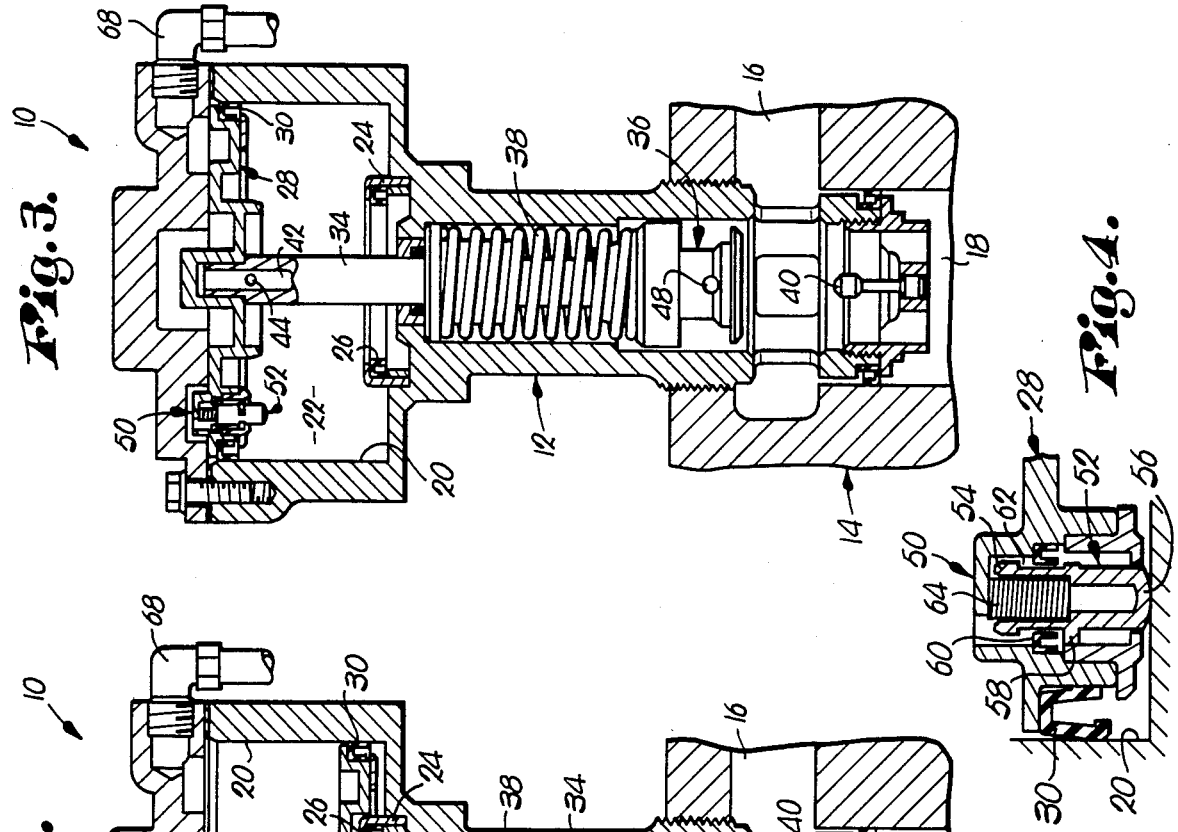
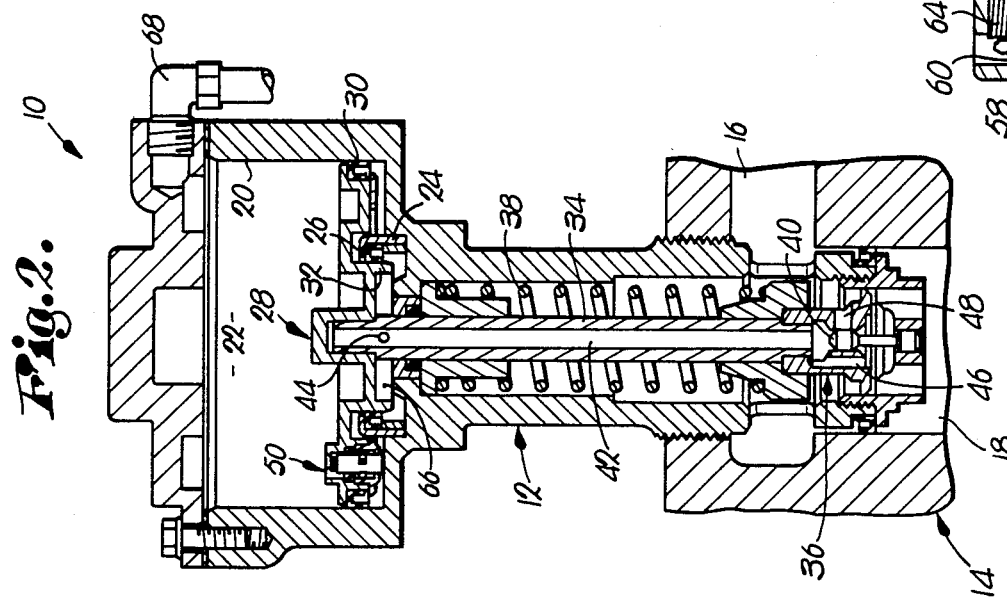
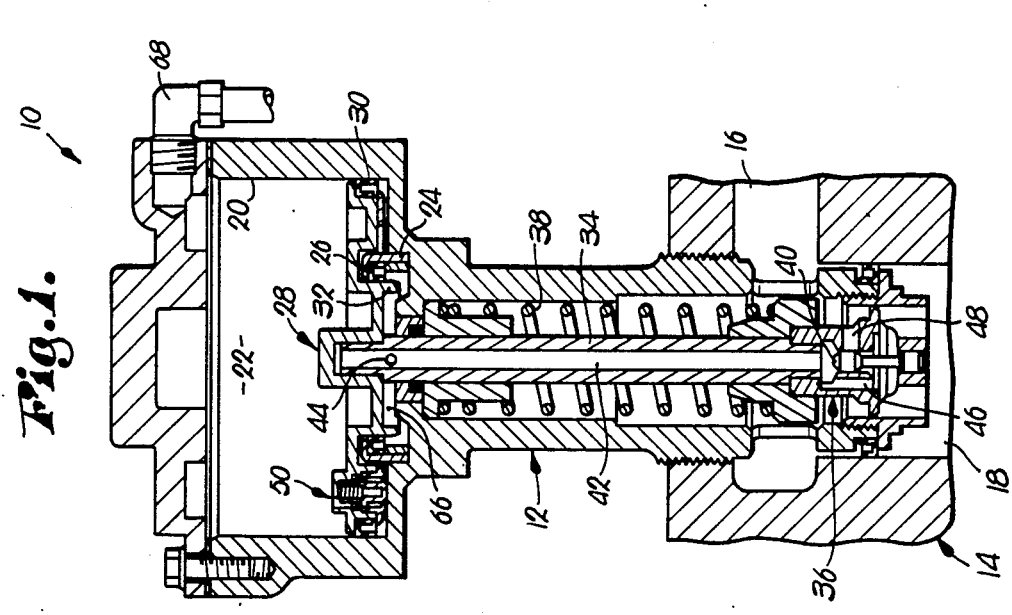

LEAK DETECTOR WITH TWO STAGE PISTON CHAMBER

BACKGROUND OF THE INVENTION

1. Field of the Invention

This invention relates to a leak detector of the type commonly used for remote submersible petroleum pumping systems, and includes a valve interposed in a fluid conduit which is shiftable by means of a pressure sensing piston received in a chamber communicating with the fluid conduit, for retaining the valve in its reduced flow position when leakage from the conduit exceeds a certain, predetermined value. The face of the piston has walls and the piston chamber has structure which cooperates with the walls to present a reduced area region when the valve is in the reduced flow position, and the piston wall disengages from the chamber structure when the valve is in the full flow position to enable the detector to compensate for greater quantities of thermal contraction of fluid in the conduit without causing the valve to return to its first, reduced flow position.

2. Description of the Prior Art

For years, detectors have been provided for sensing leakage from buried piping of a service station due to the inherent hazards of the petroleum products and the fact that such leakage could otherwise go unnoticed for exended periods of time. Typically, such detectors are positioned adjacent the buried storage tanks of the service station and monitor the downstream pressure of gasoline in the lines between the tank and a service station island or dispenser valve.

One type of leak detecting apparatus is disclosed in U.S. Pat. No. 3,454,195, issued July 8, 1969 and owned by the assignee of the present invention. In order to facilitate an understanding of the present invention, the disclosure of U.S. Pat. No. 3,454,195 is expressly incorporated into the present disclosure. Additionally, a piston leak detector identified as the Red Jacket Two-Second Leak Detector is described in some detail in Brochure No. 5170 6/80 from Red Jacket Pumps of Davenport, Iowa, and the disclosure of this brochure is also hereby expressly incorporated into the present disclosure.

In brief, the leak detectors described in U.S. Pat. No. 3,454,195 and Red Jacket Brochure No. 5170 6/80 include a diaphragm operated valve to sense gasoline leakage. When a pump adjacent the storage tank is energized, the diaphragm senses pressure in the piping and, if no leaks are present, fluid pressure in the piping will shift the diaphragm and a valve poppet coupled to the diaphragm to enable a full flow of gasoline. On the other hand, if a leak exists, fluid pressure cannot build to a value sufficient to effect complete shifting of the diaphragm and poppet, and full flow of gasoline is thus precluded.

Unfortunately, excessive thermal contraction of gasoline in the piping can lower fluid pressure against the diaphragm to such a value that the diaphragm shifts the valve poppet to prevent full flow when the dispenser valve is held open even though no leakage is present. Thermal contraction of gasoline in the piping is particularly apparent during the fall and spring seasons when ground temperatures are subject to relatively wide fluctuations in temperature. Gasoline that is pumped from a warm, relatively large underground storage tank to cold piping located a few feet below the surface of the ground can contract significantly and close the valve, causing frustration to the consumer attempting to dispense gasoline into the tank of a vehicle if the nozzle is held open during the leak detecting phase.

In order to overcome the problem of thermal contraction of gasoline in service station piping, time delay relays and solenoids are sometimes provided to prevent dispensing of gasoline at the island until a sufficient amount of time has elapsed from the time of pump actuation. However, such a procedure represents extra initial costs and added labor and expense for maintenance.

Other leak detectors are known in the art which utilize a piston instead of a diaphragm for sensing pressure of fluid within the piping and for shifting a valve between a reduced flow, metering position and a full flow position. In general, piston leak detectors are somewhat more satisfactory than diaphragm leak detectors for compensation of thermal contraction since the volume of fluid in the chamber adjacent the pressure-receiving face of the piston can be readily increased without significant mechanical problems to a relatively large volume so that contraction of the gasoline does not shift the valve poppet to any significant extent. However, when relatively large piston chambers are employed, movement of the piston when the poppet is in the leak sensing position adjacent a metering pin, is correspondingly reduced and thus a larger amount of time is ncessary for shifting the piston and poppet away from the metering pin to enable full flow. As can be appreciated, leak detectors which complete the leak sensing cycle in a time period of greater than two or three seconds are commercially undesirable.

SUMMARY OF THE INVENTION

In accordance with the present invention, a piston leak detector is provided with a two-stage piston chamber which presents fluid pressure to a reduced area of the piston face when the piston and valve poppet are in a metering position, and also presents fluid pressure to an enlarged cross-sectional area of the piston face when the piston and associated poppet are in the full flow position. As a consequence, a greater volume of thermal contraction of gasoline in the piping can occur without causing the piston and poppet to return to its reduced flow position. On the other hand, the reduced effective area of the piston face when the piston and poppet are in the metering position causes the poppet to axially shift at a rate during metering which is satisfactory for opening the valve to its full flow position after only two seconds have elapsed.

In more detail, the detector housing has a cylindrical surface defining the piston chamber and also has structure within the chamber defining a cylindrical region of a cross-sectional area smaller than the cross-sectional area of the piston chamber. The piston has a pressure-receiving face extending across the cross-sectional area of the chamber and has a seal that engages the cylindrical surface of the chamber. Walls carried by the piston define a cylinder having a cross-sectional area smaller than the area bounded by the piston seal.

The walls carried by the piston are engageable with a seal mounted in the chamber structure defining the region when the valve poppet is in a metering position, and pressure from the gasoline piping during the metering phase is exerted on the face of the piston within the area bounded by the walls. However, once the pressure in the piping builds sufficiently to move the piston and cause the valve poppet to snap to a position enabling full flow of gasoline, the walls disengage the seal carried by the chamber structure and pressure of gasoline in the piping is presented to the entire face of the piston across the entire cross-sectional area of the piston chamber. As such, a greater volume of fluid is received in the piston chamber when the valve poppet is open to compensate for thermal contraction of gasoline in the piping and to prevent shifting of the poppet back toward the metering position due to thermal contraction of the gasoline unless leakage from the piping is sensed and volume of fluid in the chamber would thereby be reduced to a value substantially smaller than what would be expected to occur by way of thermal contraction.

In preferred forms of the invention, means are provided for discharging any fluid adjacent the piston face in regions outside of the walls as the piston is moved to shift the valve poppet toward the reduced flow position, and the means comprises a vent device having a spring loaded pin that contacts the bottom of the piston chamber as the piston shifts toward the same to present a vent opening. The vent enables escape of any fluid trapped between the piston and the bottom of the piston chamber outside of the interior region presented by the walls so that the piston can readily shift the valve poppet toward its reduced flow position.

BRIEF DESCRIPTION OF THE DRAWINGS

FIG. 1 is a fragmentary, side cross-sectional view of a piston leak detector constructed in accordance with the principles of the present invention, wherein the detetor is received in a tapping of gasoline piping and a valve poppet of the detector is located at an initial, start up position for pressurizing of the piping;

FIG. 2 is a view similar to FIG. 1 except that the piston has been moved upwardly somewhat to shift the valve poppet toward a first, reduced flow metering position;

FIG. 3 is a view similar to FIGS. 1 and 2 except that the valve poppet has been shifted to a second, full flow position and walls of the piston face have disengaged from structure of the piston chamber so that the entire face of the piston is exposed to fluid pressure from gasoline in the piping; and FIG. 4 is an enlarged, fragmentary view of a venting device associated with the piston that releases any fluid trapped below the face of the piston outside of the region bounded by the chamber walls.

DETAILED DESCRIPTION OF THE DRAWINGS

The piston leak detector of the present invention is shown in FIGS. 1-4 and is designated broadly by the numeral 10. The detector 10 includes a housing 12 that is threaded into a tapping of gasoline fluid conduit or piping 14 having an upstream conduit portion 16 communicating with a pump mounted on an underground storage tank, and also a downstream conduit portion 18 that leads to downstream, buried piping for directing gasoline from the tank to a service station dispenser or island.

The detector housing 12 has an inner cylindrical surface 20 defining a piston chamber 22. The housing 12 receives a generally cylindrical structure 24 in chamber 22, and the structure 24 includes a seal 26 for purposes to be explained hereinunder.

A piston 28 is received in the chamber 22 and presents a fluid pressure receiving face on the underside of piston 28. The piston 28 is movable in the chamber 22 along the central axis of the same in response to the pressure of fluid directed toward the piston face. The piston 28 carries a seal 30 which wipingly engages the inner cylindrical surface 20 of chamber 22.

Piston 28 is fixedly connected to a hollow, cylindrical shaft means or shaft 34, the latter of which is rigidly secured to a valve poppet 36. A spring 38 biases the shaft downwardly to move the piston 28 toward the bottom of piston chamber 22 and to shift the valve poppet 36 toward a position of close surrounding adjacency with an upstanding metering pin 40 fixed to a lower section of detector housing 12. The hollow shaft 34 presents an inner channel 42 that communicates with a hole 44 extending transversely through an upper end of the shaft 34. The lower end of channel 42 is in communication with an offset passage 46 that, in turn, communicates with downstream conduit portion 18. On the other hand, pressure of fluid within the upstream conduit portion 16 is received within an apertured, hollowed lower portion of the housing 12 (in this regard, see FIG. 3) which communicates with a horizontal channel 48 that extends through poppet 36.

Referring now to FIG. 4, a venting device 50 is shown and includes a cylindrical pin 52 having an enlarged cylindrical head 54, an end 56 remote from the head 54, and four tabs 58 which extend radially outwardly from a middle section of pin 52. The venting device 50 further includes a seal 60 mounted within a passageway 62 of the piston 28, and a spring 64 which is received within an interior, hollow region of pin 52 and which abuts against a surface of piston 28.

When the pin 52 is in the position shown in FIG. 4, the venting device enables fluid trapped in areas radially outwardly from structure 24 to be discharged through passageway 62. However, when the piston 28 is shifted upwardly away from the bottom of chamber 22, spring 64 biases pin 52 downwardly until the enlarged head 54 tightly engages seal 60 to thereafter prevent fluid from discharging through passageway 62. Tabs 58 function as a stop means for retaining the pin 52 in the passageway 62 after disengagement of piston 28 from the bottom of chamber 22.

Operation

Initially, the components of detector 10 are substantially positioned as shown in FIG. 1 when the gasoline piping 14 is devoid of fluid pressure, since spring 38 functions to bias the interconnected piston 28, shaft 34 and poppet 36 downwardly to a position wherein piston 28 is directly adjacent the bottom of piston chamber 22 and valve poppet 36 closely surrounds the metering pin 40.

Once the pump (not shown) is actuated to direct fluid into the upstream conduit portion 16, the fluid enters the lower apertured section of the housing 12 as well as the poppet channel 48, and thereafter flows pass the metering pin 40 in a gap between a lower edge of pin 40 and a lower, inner corner defining channel 48. In the position of the poppet shown in FIG. 1, flow through the gap between the metering pin 40 and the poppet 36 will cause fluid to be directed into the downstream conduit portion at the rate of approximately one and one-half to three gallons per minute, in order to pressurize the piping 14 relatively quickly so that leak sensing can begin.

As soon as pressure in the downstream conduit portion 18 begins to rise and reaches a value greater than about 2 psi, fluid pressure is directed through passage 46, channel 42, hole 44, and a somewhat cylindrical region 66 that is partially bounded by the cylindrical structure 24, and piston 28 shifts upwardly from the position shown in FIG. 1 to the position shown in FIG. 2. At this time, the channel 48 is positioned directly adjacent the major cylindrical portion of the metering pin 40, and the latter restricts flow of gasoline to the downstream conduit portion at a rate of about three gallons per hour.

Next, the leak detector 10 when in the configuration shown in FIG. 2 continues to meter gasoline into the downstream conduit portion 18 at the relatively slow rate of three gallons per hour in order to sense downstream leakage of gasoline and to prevent the poppet 36 from opening to a position enabling full rate of flow if leakage in the downstream conduit portion 18 is present and exceeds three gallons per hour. In the metering position shown in FIG. 2, the pressure in the downstream conduit portion 18 continues to be directed to the piston 28 within only the region 66, and accordingly once pressure in the downstream conduit portion 18 has reached a certain, preselected value, piston 28 shifts upwardly against the bias of spring 38 to move the poppet 36 to the full flow position as shown in FIG. 3 wherein the poppet 36 is spaced from the metering pin 40 and the upstream conduit portion 16 is in substantially unrestricted fluid communication with downstream conduit portion 18.

As the piston 28 moves from the metering position shown in FIG. 2 to the full flow position shown in FIG. 3, the venting device 50 closes to prevent escape of gasoline to the upper regions of chamber 22 and out through a vent tubing 68. Once the end 56 of pin 52 disengages the bottom of piston chamber 22, spring 64 biases pin 52 downwardly until the enlarged head 54 engages seal 60 to close passageway 62.

After gasoline has been dispensed by the consumer and the pressure in the piping 14 falls, piston 28 is shifted downwardly by the bias of spring 38. As venting device 50 approaches bottom of piston chamber 22, end 56 of pin 52 engages the bottom of piston chamber 22 to shift the enlarged head 54 away from seal 60 and open passageway 62, to enable release of any fluid trapped in regions of the piston chamber 22 below piston 28 and outside of the cylindrical structure 24.

As can now be appreciated by one skilled in the art, valve poppet 36 represents a valve means which is shiftable between a first position as shown in FIG. 2 enabling a first volumetric rate of flow through the fluid conduit piping 14 and a second position which is shown in FIG. 3 enabling a second volumetric rate of flow through the piping 14 which is greater than the first volumetric rate of flow. Moreover, the structure 24, combination with wall 32 and seal 30, cooperate to provide a means for increasing the effective pressure receiving area of the face of piston 28 when the valve means or poppet 36 is moved from the first position (FIG. 2) to the second position (FIG. 3) to enable greater compensation for thermal expansion and contraction of fluid in the piping 14 by the piston 28 when the valve poppet 36 is in the second position shown in FIG. 3.

Advantageously, the structure 24 in combination with the chamber wall 32 and seal 30 cooperate to provide a means for decreasing the ratio of lineal axial movement of the piston shaft 34 to the volume of gasoline received in the piston chamber 22 as the valve poppet 36 is moved from the first position illustrated in FIG. 2 to the second position shown in FIG. 2. As a consequence, the axial extent of movement of the valve poppet 36 adjacent metering pin 40 when the poppet 36 is in the positions shown in FIGS. 1 and 2 is not adversely effected since only a relatively small increase in the quantity of fluid received in region 66 is necessary to shift piston 28 upwardly due to the relatively small area of the region 66 that is bounded by wall 32, structure 24, a central region of the bottom of piston chamber 22 and a central, small region of piston 28. However, after pressure has risen within region 66 to a value sufficient to shift the piston 28 upwardly and disengage wall 32 from seal 26, fluid from piping 14 is received in substantially the entire area of piston chamber 22 bounded by cylindrical surface 20 and the entire face of piston 28 to thereby present a substantially larger volume available for reception of the gasoline and enable greater compensation for thermal contraction of fluid when the valve poppet 36 is in the full flow position. The relatively large cross-sectional area presented by the piston chamber 22 when the piston 28 is in the position shown in FIG. 3 functions as an accumulator to enable a substantially large thermal contraction to occur without tripping the detector 10 to the configuration shown in FIG. 2, which would otherwise be a significant nuisance to consumers attempting to dispense gasoline during the leak detecting, metering phase.

I claim:

1. For use with a fluid conduit, a detector for sensing leakage of fluid from said conduit and for restricting the flow of fluid through said conduit whenever said leakage exceeds a certain, predetermined rate of flow, said detector comprising:

a housing defining a chamber;

a piston received in said chamber presenting a fluid pressure-receiving face and movable in said chamber in response to the pressure of fluid directed to said piston face;

means connected to said housing for communicating said fluid conduit to said housing chamber to enable movement of the piston in said chamber in accordance to the fluid pressure in said conduit;

valve means coupled to said piston for movement therewith and adapted for interposition in said fluid conduit, said valve means being shiftable between a first position enabling a first volumetric rate of flow through said fluid conduit and a second position enabling a second volumetric rate of flow through said conduit which is greater than said first volumetric rate of flow; and means for increasing the area of said fluid pressure-receiving face of said piston when said valve means is moved from said first position to said second position to enable greater compensation for thermal expansion and contraction of fluid in said fluid conduit by said piston when said valve means is in said second position.

2. The invention as set forth in claim 1, wherein said means for varying the area of said piston face includes:

walls connected to said piston face defining an area smaller than the overall area of said piston face, and structure in said chamber defining an area smaller than the overall cross-sectional area of said chamber, said structure being engageable with said walls when said piston is in said first position to thereby cause said fluid pressure to be distributed across said smaller area of said piston face, said structure being disengaged from said walls when said piston is in said second position to enable fluid pressure from said conduit to be distributed to substantially the entire area of said piston face thereby causing the ratio of lineal movement of said piston per volumetric change in fluid volume to be decreased.

3. The invention as set forth in claim 2; including means for discharging any fluid adjacent said piston face in regions outside of said piston walls as said piston is moved to shift said valve means toward said first position.

4. The invention as set forth in claim 1, wherein a shaft interconnects said valve means and said piston and said shaft is hollow for commmunicating fluid in said conduit to said chamber adjacent said face.

5. For use with a fluid conduit, a detector for sensing leakage of fluid from said conduit and for restricting the flow of fluid through said conduit whenever said leakage exceeds a certain, predetermined rate of flow, said detector comprising:

a housing defining a chamber;

a piston received in said chamber presenting a fluid pressure-receiving face and movable in said chamber in response to the pressure of fluid directed to said piston face;

means connected to said housing for communicating said fluid conduit to said housing chamber to enable movement of the piston in said chamber in accordance to the fluid pressure in said conduit;

valve means adapted for interposition in said fluid conduit and shiftable between a first position enabling a reduced volumetric rate of flow through said conduit and a second position enabling an increased volumetric rate of flow through said conduit which is larger than said reduced rate of flow;

shaft means interconnecting said valve means and said piston and axially movable shifting of said valve means between said first and second positions during movement of said piston; and means for decreasing the ratio of lineal axial movement of said shaft to the volume of fluid received in said chamber as said valve means is moved from said first position to said second position to enable greater compensation for thermal contraction of fluid when said valve means is in said second position.

6. The invention as set forth in claim 5, wherein the means for decreasing said ratio includes means for increasing the effective area of said pressure-receiving face of said piston when said valve means is moved from said first position to said second position.

7. The invention as set forth in claim 6, wherein said shaft means is hollow for communicating fluid in said conduit to said chamber adjacent said face of said piston.

8. The invention as set forth in claim 7; including means for discharging any trapped fluid adjacent said piston face as said valve means is moved from said second position toward said first position.

* * * * *